Patented Apr. 6, 1954

2,674,617

UNITED STATES PATENT OFFICE 2,674,617

N-(3-ALKOXY - 2 - KETOPROPYL)-p-AMINO-BENZOATE COMPOUNDS AND METHOD OF PREPARING SAME

David I. Weisblat, Galesburg, and Barney J. Magerlein, Kalamazoo, Mich., and Stanley T. Rolfson, Martinsville, Va., assignors to The Upjohn Company, Kalamazoo, Mich., a corporation of Michigan No Drawing. Application October 30, 1952, Serial No. 317,814

8 Claims. (Cl. 260—470)

This invention relates to certain new alkoxy-ketopropyl compounds, particularly to N-(3-alkoxy - 2 - ketopropyl) - p - aminobenzoate compounds, and to a method for their preparation. This application is a continuation-in-part of U. S. Patent No. 2,625,562, issued January 13, 1953.

The N-(3-alkoxy-2-ketopropyl)-p-aminobenzoate compounds of the invention have the generic formula

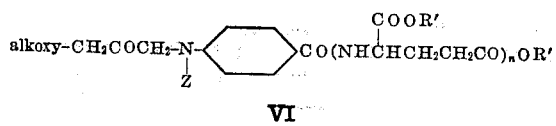

VI

N-(3-alkoxy-2-ketopropyl)-p-aminobenzoate compound wherein R' is a member of the group consisting of hydrogen and the alkyl radicals, $n$ is a member of the group consisting of zero and the positive integers 1 to 7, inclusive, and Z is a member of the group consisting of hydrogen and the arylsulfonyl radicals.

In the naming of compounds of the invention and of other compounds mentioned herein when both a glutamic acid residue and a p-aminobenzoic acid residue are included in the molecule, the nitrogen atom of the glutamic acid residue is, for convenience, herein referred to by the symbol "N'" and the nitrogen atom of the p-aminobenzoic acid residue is referred to by the symbol "N." As indicated by the generic formula given, compounds containing more than one glutamic acid or ester residue contemplated by the invention are those wherein only the gamma-carboxyl groups are involved in the peptide linkages. In the structural formulae given herein, aromatic nuclei are represented by one or more simple hexagons.

The compounds of the invention are of particular value as intermediates in the preparation of certain compounds referred to broadly in the art as "folic acids." Thus, as described and claimed in U. S. Patent 2,558,711, diethyl N'-(N-(3-methoxy - 2-ketopropyl) -N-(p-toluenesulfonyl) - p-aminobenzoyl)-glutamate, which can be prepared by the method of the present invention, can be condensed with 2,4,5-triamino-6-hydroxy-pyrimidine to form diethyl N'-(N-((2-amino-4-hydroxy - 6 - pteridyl)-methyl-N-(p-toluenesulfonyl)-p-aminobenzoyl)-glutamate. The latter compound, upon removal of the p-toluenesulfonyl radical from the molecule and after subsequent hydrolysis of the ester groups is converted to N' - (N - ((2 - amino - 4 - hydroxy - 6 - pteridyl) - methyl) - N - (p - aminobenzoyl) - glutamic acid (pteroylglutamic acid) generally recognized, when the glutamic acid residue has the same configuration as 1(+)-glutamic acid, as being identical with the "L. casei factor" or vitamin Bc from liver. When N'-(N-(3-methoxy-2-ketopropyl)-p-aminobenzoyl)-glutamic acid is condensed with 2,4,5-triamino-6-hydroxypyrimidine, pteroylglutamic acid is formed directly without the necessity of splitting an arylsulfonyl radical from the product or of hydrolyzing ester groups. In similar fashion, other N-(3-alkoxy-2-ketopropyl)-p-aminobenzoate compounds of the invention can be condensed with 2,4,5-triamino-6-hydroxypyrimidine to form the corresponding 2-amino-4-hydroxy-6-pteridyl compounds of the folic acid type.

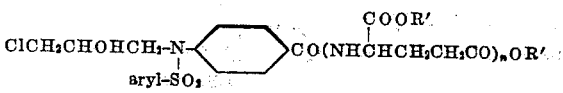

I

N-(3-chloro-2-hydroxypropyl)-p-aminobenzoate compound

↓ alkali

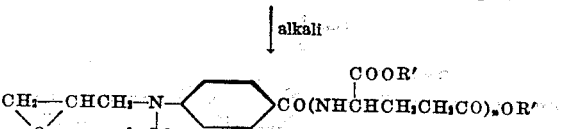

II

N-(2,3-epoxypropyl)-p-aminobenzoate compound

↓ alkanol and metal alkoxide

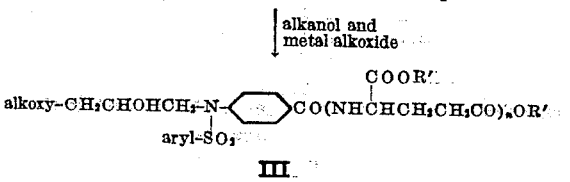

III

N-(3-alkoxy-2-hydroxypropyl)-p-aminobenzoate compound

↓ CrO₃

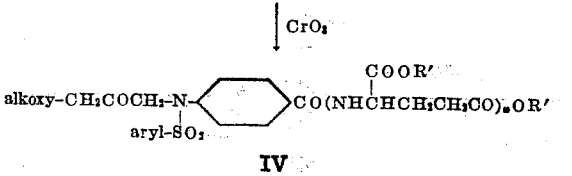

IV

N-(3-alkoxy - 2 - ketopropyl)- p - aminobenzoate compound (wherein Z of Formula VI is an arylsulfonyl radical)

↓ HBr

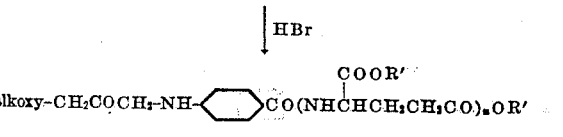

V

N-(3-alkoxy-2-ketopropyl)-p-aminobenzoate compound (wherein Z of Formula VI is hydrogen)

The N-(3-alkoxy-2-ketopropyl) - p-aminobenzoate compounds of the invention wherein Z is an arylsulfonyl radical are prepared readily, as shown in the accompanying reaction chart wherein R' and $n$ have the values given previously, by oxidizing an N-(3-alkoxy-2-hydroxypropyl)-p-aminobenzoate Compound III with chromic anhydride in an inert water-soluble solvent. The keto Compounds IV thus formed can be converted readily to N-(3-alkoxy-2-ketopropyl)-p-aminobenzoate compounds of the invention wherein Z is hydrogen (V) by treatment with hydrogen bromide according to the method of United States Patent 2,562,222 for splitting an arylsulfonyl radical from the molecule. The compounds having the Formulae IV and V in the accompanying reaction chart together constitute the compounds of the invention having the Formula VI given previously. Those of the compounds which are esters can by hydrolyzed readily to the corresponding acids with dilute alkali.

The oxidation of an N-(3-alkoxy-2-hydroxypropyl)-N-(arylsulfonyl)-p-aminobenzoate compound with chromic acid can be carried out by subjecting the alkoxyhydroxypropyl compound to the action of chromic anhydride in an inert water-soluble solvent. Suitable solvents include the aliphatic acids, such as acetic, propionic, butyric and valeric acids, acetone, and others as well as mixtures thereof. A mixture of an alkali metal dichromate and a mineral acid, such as sulfuric acid, can often be used in place of chromic anhydride, if desired. A small proportion, e. g. from 5 to 10 per cent or less, of water can often be included in the mixture, if desired. A solution of the N-(3-alkoxy-2-hydroxypropyl)-N-(arylsulfonyl)-p-aminobenzoate compound and of chromic anhydride in acetic acid can be prepared and allowed to stand for several hours at from about 0 degrees to about 30 degrees C. or somewhat higher, or the N-(3-alkoxy-2-hydroxypropyl)-p-aminobenzoate compound can be added gradually to a solution of chromic anhydride in acetic acid. Reaction usually occurs smoothly at ordinary room temperature or somewhat below, but the mixture can, in certain instances, be warmed gently, if desired.

The reaction is usually substantially complete in from one to several hours and the N-(3-alkoxy-2-ketopropyl)-N-(arylsulfonyl)-p-aminobenzoate compound can be recovered by diluting the reaction mixture with water and extracting the diluted mixture with ethyl acetate, ether or other suitable solvent. The extract is dried after washing with water or dilute aqueous sodium bicarbonate, depending upon whether it contains carboxy or carboxylic ester groups, and the ether or other solvent then distilled. The N-(3-alkoxy-2-ketopropyl)-N-(arylsulfonyl)-p-aminobenzoate compound is thus obtained as a solid residue which is usually sufficiently pure for further use, but which can, if desired, be purified further by crystallization or in other convenient manner. Purification can also be effected using Girard's reagent P. or T. to yield the alkoxyketone usually in solid form.

The arylsulfonyl radical can be split readily from an N-(3-alkoxy-2-ketopropyl) - N - (arylsulfonyl) - p - aminobenzoate compound having the Formula IV according to the method mentioned previously to form N - (3 - alkoxy-2-ketopropyl)-p-aminobenzoate compounds having the Formula V, usually without isolating the arylsulfonyl-containing compound from the acetic acid reaction mixture, if desired. The reaction is carried out conveniently by mixing the arylsulfonyl compound, hydrogen bromide and a bromine acceptor, such as phenol, catechol or naphthol, in an anhydrous aliphatic acid medium, usually at ordinary room temperature. Several molar proportions of hydrogen bromide are usually employed. After standing for a sufficient length of time, usually for from a few minutes to a few hours, the mixture can be poured into ether or petroleum naphtha and the hydrobromide of the free amine recovered by filtering. Other convenient and apparent ways for recovering the amine or its hydrobromide can be employed.

Many of the arylsulfonyl-containing N-(3-alkoxy - 2 - ketopropyl)-p-aminobenzoate compounds and the free amines obtained as just described are crystalline or amorphous, white or yellowish solids which can be purified by crystallization from a suitable solvent. Others of the compounds are oily in nature. They form crystalline semicarbazones and other normal ketone derivatives.

As indicated by the generic Formula VI, N-(3-alkoxy - 2 - ketopropyl) - p - aminobenzoate compounds containing more than one glutamic acid or ester residue contemplated by the invention are those wherein only the gamma-carboxyl groups are involved in the peptide linkages, such as the residues derived from N'-(p-aminobenzoyl) - gamma - glutamylglutamic acid, N' - (p-aminobenzoyl) - gamma - glutamyl - gamma-glutamylglutamic acid, and the like. Preferred compounds of the invention are those wherein $n$ represents the integer 1, i. e. those containing one glutamic acid or ester residue, and the invention will be described with particular reference thereto.

Compounds similar to, or identical with, those of the folic acid group made by using compounds of the invention as intermediates, such as pteroylglutamic acid and pteroyl-gamma-glutamyl-gamma-glutamylglutamic acid, which are of greatest value as measured by their biological activity against *Lactobacillus casei* or *Streptococcus fecalis R*, are those wherein the glutamic acid residues possess the same configuration as 1(+)-glutamic acid. However, the invention also contemplates compounds having the dextro configuration as well as racemic mixtures.

N - (3 - alkoxy - 2 - ketopropyl) - p - aminobenzoate compounds wherein Z of the generic Formula VI represents an arylsulfonyl radical, are of particular value because of the protection afforded the aromatic amino group by the arylsulfonyl group. Compounds having the amino group thus protected are often not subject to decomposition and the formation of by-products when employed as a reactant, e. g. when condensed with 2,4,5-triamino-6-hydroxypyrimidine, to nearly the same extent as are compounds in which the aromatic amino group is unprotected. Following the carrying out of a reaction using an N-(3-alkoxy-2-ketopropyl)-p-aminobenzoate compound containing such an arylsulfonylamino group, the arylsulfonyl radical can be split readily from the molecule formed, as mentioned previously, by treating the compound with hydrogen bromide in an aliphatic acid medium and in the presence of a bromide acceptor.

Although the invention is described in the case of arylsulfonyl compounds with particular reference to p-toluenesulfonyl compounds, it is understood that the invention contemplates compounds and intermediates containing other arylsulfonyl radicals, such as the o-toluenesulfonyl, benzenesulfonyl, and naphthalenesulfonyl radicals as well as many others. Arylsulfonyl radicals having substituents, such as chlorine, bromine, or a nitro group, on the aromatic nucleus can also be used provided only that the substituent is non-reactive under the reaction conditions. The preferred arylsulfonyl radical is the p-toluenesulfonyl radical because the compounds formed are generally well defined crystalline solids and because it has been found that higher yields of amines are often formed when splitting a p-toluenesulfonylamine compound than when splitting certain other arylsulfonyl derivatives of the same amino compound. It should be mentioned, furthermore, that the method involved in the present invention can be carried out and the corresponding final compounds prepared using starting compounds where in the arylsulfonyl group is replaced by an alkylsulfonyl, aralkylsulfonyl or cycloakyllsulfonyl group, such as the methanesulfonyl, alpha-toluenesulfonyl or cyclohexylsulfonyl radicals, respectively.

Although benzoic acid ester or glutamic acid ester residues present in certain of the compounds of the invention can comprise any alkyl ester, such as the methyl, ethyl, n-propyl, iso-propyl, n-butyl, tert.-butyl, amyl, lauryl, dodecyl and many other esters, the preferred ester is the ethyl ester due to matters of convenience and economy.

Although the invention is directed particularly, in case of esters of the aminobenzoic acid and glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

Insofar as is known, the alkoxy radical in the Compounds VI of the invention can comprise any alkyl radical, such as the methyl, ethyl, n-propyl, iso-propyl, tert.-butyl, dodecyl, and others. It should be mentioned, however, that the preferred compounds are those wherein the alkoxy radical attached to the third carbon atom of the ketopropyl group comprises a methyl radical, i. e. compounds wherein the alkoxy radical is the methoxy radical, because of the greater ease with which these compounds can be condensed with 2,4,5-triamino-6-hydroxypyrimidine as compared with compounds wherein the alkoxy radical contains a higher molecular weight alkyl radical. For this reason, the invention is described with particular respect to the compounds wherein the alkoxy radical is the methoxy radical.

The N-(3-alkoxy-2-hydroxypropyl)-p-aminobenzoate Compounds III, from which the N-(3-alkoxy-2-ketopropyl)-p-aminobenzoate compounds of the invention can be prepared by oxidation with chromic acid, can, themselves, be prepared in any convenient way. One such way includes first treating an N-(3-chloro-2-hydroxypropyl)-p-aminobenzoate Compound I with an alkali to remove hydrogen chloride from the molecule, according to the method described in co-pending application Serial No. 41,884, now U. S. Patent 2,629,733, and described and claimed in co-pending application Serial No. 317,813, which is a continuation-in-part of U. S. Patent 2,629,733, and form an N-(2,3-epoxypropyl)-p-aminobenzoate Compound II which is then treated with an alkanol to form the hydroxy Compound III desired. The preparation of the latter compound by the procedure just given is described and claimed in U. S. Patent 2,629,733.

Certain advantages of the invention are apparent from the following examples which are given by way of illustration only and are not to be construed as limiting.

*Example 1.—Ethyl N - (3 - chloro-2 - hydroxy-propyl) -N-(p-toluene sulfonyl) - p - aminobenzoate*

A mixture of 5 grams of ethyl p-toluenesulfonyl-p-aminobenzoate and 3.4 milliliters of epichlorohydrin was heated at 135 degrees C. and 2 drops of pyridine added. A vigorous action ensued and after 5 minutes the mixture was cooled, dissolved in 50 milliliters of ethanol and treated three times with decolorizing carbon. The ethyl N-(3-chloro-2-hydroxypropyl)-N-(p-toluenesulfonyl)-p-aminobenzoate which remained upon volatilization of the ethanol and excess epichlorohydrin in vacuo was used in subsequent reactions without further purification.

In similar fashion methyl N-(3-chloro-2-hydroxypropyl) -N- (o-toluenesulfonyl) -p- aminobenzoate, n - butyl N - (3-chloro - 2 - hydroxy-propyl) - N - (beta - naphthalenesulfonyl) - p - aminobenzoate, and dodecyl N-(3-chloro-2-hydroxypropyl) -N- (p - chlorobenzensulfonyl) -p-aminobenzoate are obtained by substituting an equimolar proportion of methyl N-(o-toluenesulfonyl) -p-aminobenzoate, n-butyl N-(beta-naphthalenesulfonyl) -p-aminobenzoate, and dodecyl N-(p-chlorobenzenesulfonyl) -p- aminobenzoate, respectively, for the ethyl N-(p-toluenesulfonyl)-p-aminobenzoate in the foregoing procedure.

*Example 2.—Diethyl N'-(N-3-chloro-2-hydroxypropyl) -N- (p-toluenesulfonyl) -p- aminobenzoyl) -glutamate*

A mixture of 2.85 grams of diethyl N'-(N-(p-toluenesulfonyl)-p-aminobenzoyl)- glutamate and 1.1 grams of epichlorohydrin was agitated at 135 degrees C. Two drops of pyridine were added and agitation at 135 degrees C. was continued for 5 minutes. The excess epichlorohydrin was volatilized under reduced pressure. The residue which consisted of diethyl N'-(N-(3 - chloro - 2 - hydroxypropyl) - N - (p - toluenesulfonyl) -p- aminobenzoyl)-glutamate was used in subsequent experiments without further purification.

When an equi-molar proportion of dimethyl N'-(N-(benzenesulfonyl) -p-aminobenzoyl)-glutamate, di-iso-butyl N'-(N-(beta-naphthalenesulfonyl)-p-aminobenzoyl-glutamate, or di-dodecyl N'-(N-(o-toluenesulfonyl)-p-aminobenzoyl)-glutamate, is substituted for the diethyl N'-(N-(p-toluenesulfonyl) - p - aminobenzoyl) - glutamate in the above procedure, there is obtained dimethyl N'-(N-(3-chloro-2-hydroxypropyl)-N-(benzenesulfonyl)-p-aminobenzoyl)-glutamate, di-iso-butyl N'-(N-(3-chloro-2-hydroxypropyl) -N - (beta - naphthalenesulfonyl) -p-aminobenzoyl)-glutamate and di-dodecyl N'-(N - (3 - chloro-2-hydroxypropyl) -N-(o-toluenesulfonyl) -p-aminobenzoyl)-glutamate, respectively.

*Example 3.—Ethyl N-(2,3-epoxypropyl)-N-(p-toluenesulfonyl)-p-aminobenzoate*

In a manner similar to that described in Example 4, ethyl N-(3-chloro - 2 - hydroxypropyl) -N-(p - toluenesulfonyl) - p - aminobenzoate was treated with anhydrous potassium carbonate in anhydrous methyl ethyl ketone. The mixture was refluxed two hours. From the mixture there was isolated a product containing 33 per cent of ethyl N-(2,3-epoxypropyl) - N-(p - toluenesulfonyl) -p-aminobenzoate.

In an analogous manner to that given in the first paragraph and using an equi-molar proportion of methyl N-(3 - chloro-2 - hydroxypropyl) - N - (o-toluenesulfonyl) - p-aminobenzoate, n-butyl N-(3-chloro-2 - hydroxypropyl) - N-(beta - naphthalenesulfonyl) - p - aminobenzoate, and dodecyl N-(3 - chloro - 2-hydroxypropyl) -N-(p - chlorobenzenesulfonyl) - p - aminobenzoate in place of the ethyl N-(3-chloro-2-hydroxypropyl) -N-(p-toluenesulfonyl) - p-aminobenzoate there is obtained methyl N-(2,3-epoxypropyl) - N - (o-toluenesulfonyl) - p - aminobenzoate, n-butyl N-(2,3-epoxypropyl) -N-(beta-naphthalenesulfonyl) -p-aminobenzoate and dodecyl N-(2,3-epoxypropyl) -N-(p-chlorobenzenesulfonyl) -p-aminobenzoate, respectively.

*Example 4.—Diethyl N'-(N-(2,3-epoxypropyl)- N-(p-toluenesulfonyl) - p - aminobenzoyl) -glutamate*

A mixture consisting of about 1.3 grams of diethyl N'-(N-(3 - chloro-2-hydroxypropyl) -N-(p-toluenesulfonyl) -p-aminobenzoyl) -glutamate, 20 milliliters of methyl ethyl ketone, 0.17 gram of sodium bicarbonate and 3 milliliters of water was refluxed for 40 minutes. The methyl ethyl ketone and water were then distilled in vacuo and the residue taken up in a mixture of ether and water containing a small proportion of alcohol. The ether layer was separated, washed with cold dilute sulphuric acid and then with water and saturated sodium bicarbonate solution and finally twice with water and once with saturated sodium chloride solution. The washed solution was filtered through anhydrous sodium sulfate and the ether distilled in vacuo. The residue consisted of 0.98 gram of diethyl N'-(N-(2,3-epoxypropyl) - N - (p-toluenesulfonyl) -p-aminobenzoyl) -glutamate in the form of a light brown oil. This is a yield of 87.5 per cent of the theoretical amount.

The epoxypropyl compound obtained as just described and other epoxy compounds described in the examples were assayed for epoxy content by the following procedure: One gram of the epoxy compound was dissolved in 5 milliliters of absolute ethanol and 20 milliliters of a 0.1 to 0.15 normal standardized solution of hydrogen chloride in ether was added. After standing at room temperature for 2 hours, 30 to 40 milliliters of water was added to the mixture and the unreacted hydrogen chloride titrated with standardized alkali. The hydrogen chloride consumed was a measure of the amount of epoxy compound present. When analyzed in this manner, the crude epoxypropyl compound was shown to contain 49.4 per cent of epoxy compound.

When the above procedure was carried out using dilute ethanol instead of methyl ethyl ketone, there was obtained a 75 per cent yield of product which upon assay for epoxy content proved to be 80 per cent pure diethyl N'-(N-(2,3-epoxypropyl) - N - (p-toluenesulfonyl) -p-aminobenzoyl) -glutamate.

When the procedure was carried out using anhydrous potassium carbonate and anhydrous methyl ethyl ketone there was obtained a 72 per cent yield of product which upon assay was found to contain 42.8 per cent of diethyl N'-(N-(2,3-epoxypropyl) -N-(p-toluenesulfonyl) -p-aminobenzoyl) -glutamate.

Following the procedure of the first paragraph above and using an equimolar proportion of dimethyl N'-(N-(3-chloro - 2 - hydroxypropyl) -N-(benzenesulfonyl) -p-aminobenzoyl) - glutamate, di-iso-butyl N'-(N-(3-chloro-2-hydroxypropyl) - N-(beta-naphthalene sulfonyl) - p - aminobenzoyl) -glutamate and di-dodecyl N'-(N-(3-chloro-2-hydroxypropyl) -N-(o-toluenesulfonyl) -p-aminobenzoyl) -glutamate in place of diethyl N'-(N-(3-chloro-2-hydroxypropyl) -N-(p-toluenesulfonyl) -p-aminobenzoyl) -glutamate there is obtained dimethyl N'-(N-(2,3 - epoxypropyl) -N-(benzenesulfonyl) - p - aminobenzoyl) -glutamate, di-iso-butyl N'-(N-(2,3-epoxypropyl) - N - (beta-naphthalenesulfonyl) - p - aminobenzoyl) - glutamate and di-dodecyl N'-(N-(2,3-epoxypropyl) -N-(o-toluenesulfonyl) - p - aminobenzoyl) - glutamate, respectively.

*Example 5.—N -(3 - methoxy-2-hydroxypropyl)- N-(p-toluenesulfonyl) -p-aminobenzoic acid*

A mixture of 1.1 grams of ethyl N-(2,3-epoxypropyl) -N-(p-toluenesulfonyl) -p-aminobenzoate, 12 milliliters of methanol and 0.34 gram of sodium methoxide was allowed to stand at room temperature for 3 hours and then refluxed for one hour. The mixture was then cooled, diluted with water and extracted with 10 milliliters of ether. Acidification of the extracted aqueous solution with hydrochloric acid gave a precipitate which, after filtering and drying, consisted of 0.94 gram of N-(3 - methoxy-2-hydroxypropyl) -N-(p-toluenesulfonyl) -p-aminobenzoic acid melting at 152 degrees to 158 degrees C. After recrystallization from methanol, the product melted at 157 degrees to 159 degrees C. It had a neutral equivalent of 360 as compared with the calculated value of 379.

In similar fashion and replacing the ethyl N-(2,3-epoxypropyl) -N-(p-toluenesulfonyl) -p-aminobenzoate with one molar proportion of methyl N-(2,3-epoxypropyl) - N - (o-toluenesulfonyl) -p-aminobenzoate, n-butyl N-(2,3-epoxypropyl) -N-(beta - naphthalenesulfonyl) - p - aminobenzoate, dodecyl N-(2,3-epoxypropyl) - N - (p-chlorobenzenesulfonyl) -p-aminobenzoate, dimethyl N'-(N-(2,3 - epoxypropyl) -N-(benzenesulfonyl) -p-aminobenzoyl) -glutamate, di-iso-butyl N'- (N - (2,3-epoxypropyl) -N-(beta - naphthalenesulfonyl) -p-aminobenzoyl) - glutamate, di-dodecyl N'- (N-(2,3-epoxypropyl) -N-(o-toluenesulfonyl) -p-aminobenzoyl) -glutamate and di-ethyl N'-(N-(2,3-epoxypropyl) -N-(p-toluenesulfonyl) - p - aminobenzoyl) -glutamate and the methoxide in the respective instances with one molar proportion, based on the epoxide, of sodium alkoxide derived from ethanol, n-butanol, iso-propanol, dodecanol, n-amylol, n-heptanol and methanol there is obtained methyl N-(3-ethoxy - 2 - hydroxypropyl) -N-(o-toluenesulfonyl) -p-aminobenzoate, n-butyl N-(3-n-butoxy-2-hydroxypropyl) -N-(beta-naphthalenesulfonyl) -p-aminobenzoate, dodecyl N-(3 - iso-propoxy-2-hydroxypropyl) -N-(p-chlorobenzenesulfonyl) -p-aminobenzoate, dimethyl N'-(N-(3 - dodecyloxy - 2 - hydroxypropyl) -N-(benzenesulfonyl) - p - aminobenzoyl) -glutamate, di-iso-butyl N'-(N-(3 - n - amyloxy-2-hydroxypropyl) -N-(beta - naphthalenesulfonyl) - p - aminobenzoyl) -glutamate, di-dodecyl N'-(N-(3-n-heptyloxy-2-hydroxypropyl) -N-(o-toluenesulfonyl) -p-aminobenzoyl) -glutamate and diethyl N'-(N-(3 - methoxy-2-hydroxypropyl) -N-(p-toluenesulfonyl) -p-aminobenzoyl) -glutamate, respectively.

The hydroxy esters thus prepared are hydro-

Example 6.—N-(3-methoxy-2-ketopropyl)-N-(p-toluenesulfonyl)-p-aminobenzoic acid A solution of 0.33 gram of chromic anhydride in 0.5 milliliter of water and 3 milliliters of acetic acid was added to a solution of 0.95 gram of N-(3-methoxy - 2 - hydroxypropyl)-N-(p-toluenesulfonyl)-p-aminobenzoic acid in 15 milliliters of acetic acid. The mixture was allowed to stand overnight at room temperature and the acetic acid then distilled in vacuo. There was obtained a green syrup from which N-(3-methoxy-2-ketopropyl)-N-(p - toluenesulfonyl)-p-aminobenzoic acid was isolated.

Following the same procedure and substituting an equi-molar proportion of methyl N-(3-ethoxy-2-hydroxypropyl) - N - (o - toluenesulfonyl)-p-aminobenzoate, n-butyl N-(3-n-butoxy-2-hydroxypropyl) - N - (beta-naphthalenesulfonyl)-p-aminobenzoate, dodecyl N-(3-iso-propoxy-2-hydroxypropyl)-N-(p - chlorobenzenesulfonyl)-p-aminobenzoate, or the corresponding hydroxy acids for the N-(3-methoxy-2-hydroxypropyl)-N-(p-toluenesulfonyl) - p - aminobenzoic acid there is obtained methyl N-(3-ethoxy-2-ketopropyl)-N-(o-toluenesulfonyl) - p - aminobenzoate, n-butyl N-(3-n-butoxy-2-ketopropyl)-N-(beta - naphthalene sulfonyl)-p-aminobenzoate, dodecyl N - (3-iso-propoxy-2-ketopropyl)-N-(p-chlorobenzenesulfonyl) - p - aminobenzoate, and the corresponding keto acids, respectively.

Example 7.—Diethyl N' - (N-(3-methoxy - 2-ketopropyl) - N-(p-toluenesulfonyl)-p-aminobenzoyl)-glutamate A solution of 0.536 gram of chromic acid in about 5 milliliters of water was added slowly at 20 degrees C. and with stirring to a solution of 2 grams of diethyl N'-(N-(3-methoxy - 2-hydroxypropyl) - N - (p-toluenesulfonyl)-p-aminobenzoyl) - 1-glutamate in 19 milliliters of glacial acetic acid. The mixture was allowed to stand for three and one-half hours and was then poured into water and extracted with benzene. The benzene layer was washed thoroughly with water and the benzene vaporized in vacuo. There was thus obtained a residue consisting of 1.3 grams of diethyl N'-(N-(3-methoxy-2-ketopropyl) - N - (p-toluenesulfonyl)-p-aminobenzoyl) - 1-glutamate having an index of refraction $N_D^{26}=1.5440$ and melting at 82 degrees to 84 degrees C.

Following the same procedure and substituting an equi-molar proportion of dimethyl N'-(N-(3-dodecyloxy - 2 - hydroxypropyl)-N-(benzenesulfonyl)-p-aminobenzoyl) - glutamate, di-iso-butyl N' - (N-(3-n-amyloxy-2-hydroxypropyl)-N-(betanaphthalenesulfonyl) - p - aminobenzoyl) - glutamate, di-dodecyl N'-(N-(3-n-heptyloxy-2-hydroxypropyl) - N - (o-toluenesulfonyl) - p - aminobenzoyl) - glutamate, or the corresponding hydroxy acids for the diethyl N'-(N-(3-methoxy - 2-hydroxypropyl)-N-(p - toluenesulfonyl) - p - aminobenzoyl) - glutamate there is obtained dimethyl N'-(N-(3-dodecyloxy-2 - ketopropyl)-N-(benzenesulfonyl) - p - aminobenzoyl) - glutamate, di-iso-butyl N'-(N-(3-n-amyloxy - 2 - ketopropyl)-N-(beta-naphthalenesulfonyl) - p - aminobenzoyl)-glutamate, di-dodecyl N' - (N-(3-n-heptyloxy - 2 - ketopropyl)-N-(o-toluenesulfonyl) - p - aminobenzoyl)-glutamate, and the corresponding keto acids, respectively.

Example 8.—Diethyl N'-(N-(3-methoxy-2-ketopropyl) - N - (p-toluenesulfonyl)-p-aminobenzoyl)-1-glutamate A mixture was prepared consisting of 70 milliliters of acetic acid, 20 milliliters of propionic acid and 4.95 grams of diethyl N'-(N-(3-methoxy - 2 - hydroxypropyl)-N-(p-toluenesulfonyl)-p-aminobenzoyl) - 1 - glutamate. The mixture was cooled at 3 degrees C. and a solution of 1.17 grams of chromic anhydride in 10 milliliters of water was added. The mixture was allowed to stand at about 3 degrees C. for seventeen hours then poured into a mixture of 200 milliliters of water and 100 milliliters of benzene. After thorough agitation, the benzene layer was separated and washed with dilute aqueous sodium bicarbonate. Evaporation of the benzene from the washed benzene layer left a residue consisting of 4.1 grams of syrupy diethyl N'-(N-(3-methoxy - 2 - ketopropyl)-N-(p - toluenesulfonyl) - p - aminobenzoyl)-1-glutamate. Recrystallization of the syrup from dilute ethanol gave a crystalline product melting at 82 degrees to 84 degrees C.

Example 9.—Ethyl N-(3-methoxy-2-ketopropyl)-p-aminobenzoate hydrobromide

A mixture is prepared consisting of 0.5 gram of ethyl N - (3-methoxy-2-ketopropyl)-N-(p-toluenesulfonyl) - p - aminobenzoate, 0.235 gram of phenol and 5 milliliters of a 25 per cent solution of hydrogen bromide in glacial acetic acid. The mixture is allowed to stand for 2 hours at room temperature and then poured into 40 milliliters of dry ether. The mixture is filtered and the residue washed with dry ether and then dried. There is thus obtained 0.07 gram of ethyl N-(3-methoxy - 2 - ketopropyl)-p-aminobenzoate hydrobromide. This product, when condensed with 2,4,5 - triamino-6-hydroxypyrimidine, yields a product having a marked activity for Streptococcus fecalis R.

In entirely analogous fashion, and using substantially equi-molar proportions of the respective reactants as used therein, the arylsulfonyl radical is split from methyl N-(3-ethoxy-2-ketopropopyl) - N - (o-toluenesulfonyl) - p - aminobenzoate, n-butyl N-(3-n-butoxy - 2 - ketopropyl) - N - (beta-napththalenesulfonyl)-p-aminobenzoate, dodecyl N-(3 - iso - propoxy-2-ketopropyl) - N - (p-chlorobenzenesulfonyl)-p-aminobenzoate, dimethyl N'-(N-(3-dodecyloxy-2 - ketopropyl) - N - (benzenesulfonyl)-p-aminobenzoyl) - glutamate, di-iso-butyl N'-(N-(3-n-amyloxy - 2 - ketopropyl)-N-(beta-naphthalenesulfonyl) - p - aminobenzoyl)-glutamate, di-dodecyl N' - (N-(3-n-heptyloxy-2-ketopropyl) - N - (o - toluenesulfonyl) - p - aminobenzoyl)-glutamate, diethyl N'-(N-(3-methoxy - 2 - ketopropyl) - N - (p-toluenesulfonyl) - p - aminobenzoyl)-glutamate and the corresponding arylsulfonyl acids to form methyl N-(3-ethoxy-2-ketopropyl) - p - aminobenzoate, n-butyl N-(3-n - butoxy - 2 - ketopropyl)-p-aminobenzoate, dodecyl N-(3-iso-propoxy-2-ketopropyl)-p-aminobenzoate, dimethyl N' - (N-(3-dodecyloxy-2-ketopropyl) - p - aminobenzoyl)-glutamate, di-iso-butyl N'-(N-(3-n-amyloxy-2-ketopropyl)-p-aminobenzoyl)-glutamate, di-dodecyl N'-(N-(3-n-heptyloxy - 2 - ketopropyl)-p-aminobenzoyl)-glutamate, diethyl N' - (N-(3-methoxy-2-ketopropyl)-p-aminobenzoyl) - glutamate and the corresponding non-arylsulfonyl acids, respectively.

It is to be understood that the invention is not

We claim:

1. The method which includes: oxidizing a compound having the formula

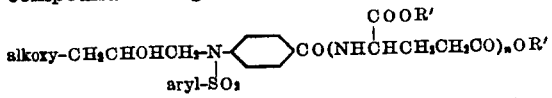

wherein R' is a member of the class consisting of hydrogen and the alkyl radicals and $n$ is a member of the class consisting of zero and the positive integer 1 with chromic acid in an inert water-soluble solvent to form a compound having the formula

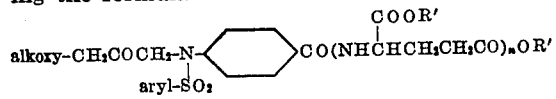

wherein R' and $n$ have the values given.

2. The method of claim 1 wherein the oxidation is carried out in acetic acid as a reaction medium.

3. The method which includes: oxidizing ethyl N-(3-methoxy-2-hydroxypropyl)-N-(p-toluenesulfonyl)-p-aminobenzoate with chromic acid in an inert water-soluble solvent to form ethyl N-(3-methoxy-2-ketopropyl)-N-(p-toluenesulfonyl)-p-aminobenzoate.

4. The method which includes: oxidizing diethyl N'-(N-(3-methoxy-2-hydroxypropyl)-N-(p-toluenesulfonyl)-p-aminobenzoyl)-glutamate with chromic acid in an inert water-soluble solvent to form diethyl N'-(N-(3-methoxy-2-ketopropyl)-N-(p-toluenesulfonyl)-p-aminobenzoyl)-glutamate.

5. A compound having the formula

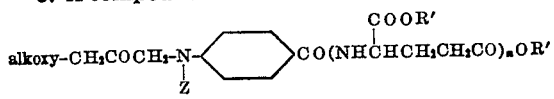

wherein R' is a member of the class consisting of hydrogen and the alkyl radicals, $n$ is a member of the class consisting of zero and the positive integer 1 and Z is a member of the class consisting of hydrogen and the arylsulfonyl radicals.

6. A compound having the formula

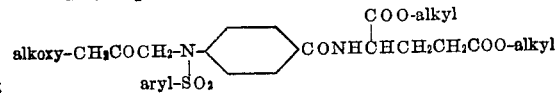

7. Ethyl N-(3-methoxy-2-ketopropyl)-N-(p-toluenesulfonyl)-p-aminobenzoate.

8. Diethyl N'-(N-(3-methoxy-2-ketopropyl)-N-(p-toluenesulfonyl)-p-aminobenzoyl)-glutamate.

No references cited.